United States Patent [19]

Bortcosh et al.

[11] Patent Number: 5,983,364
[45] Date of Patent: Nov. 9, 1999

[54] SYSTEM AND METHOD FOR DIAGNOSING COMPUTER FAULTS

[75] Inventors: Raouf W. Bortcosh, Natick; Lester S. Briney, Lincoln; Steven D. Hastings, Bolton; Timothy J. Hennessey, Mendon; Peter Hoe-Richardson, Chestnut Hill; Richard A. Hussong, Acton; Edward S. Kane, Framingham; George E. Kelley, Marlborough, all of Mass.

[73] Assignee: System Soft Corporation, East Natick, Mass.

[21] Appl. No.: 08/854,666

[22] Filed: May 12, 1997

[51] Int. Cl.[6] .................................................. G06F 11/00
[52] U.S. Cl. .............................................................. 714/25
[58] Field of Search ................................ 395/182.18, 181, 395/183.01, 183.02, 185.01, 185.04

[56] References Cited

U.S. PATENT DOCUMENTS

| | | | |
|---|---|---|---|
| 4,634,110 | 1/1987 | Julich et al. | 395/182.09 |
| 4,841,456 | 6/1989 | Hogan, Jr. et al. | 364/550 |
| 4,972,453 | 11/1990 | Daniel, III et al. | 395/183.02 |
| 4,985,857 | 1/1991 | Bajpai et al. | 364/551.01 |
| 5,107,497 | 4/1992 | Lirov et al. | 371/15.1 |
| 5,111,384 | 5/1992 | Aslanian et al. | 395/575 |
| 5,122,976 | 6/1992 | Bellows et al. | 364/550 |
| 5,123,017 | 6/1992 | Simpkins et al. | 371/15.1 |
| 5,133,046 | 7/1992 | Kaplan | 395/61 |
| 5,175,800 | 12/1992 | Galis et al. | 395/51 |
| 5,295,230 | 3/1994 | Kung | 395/75 |
| 5,315,711 | 5/1994 | Barone et al. | 395/275 |
| 5,365,310 | 11/1994 | Jenkins et al. | 355/202 |
| 5,367,667 | 11/1994 | Wahlquist et al. | 395/575 |
| 5,402,524 | 3/1995 | Bauman et al. | 395/50 |
| 5,404,503 | 4/1995 | Hill et al. | 395/575 |
| 5,412,452 | 5/1995 | Rego et al. | 355/203 |
| 5,455,933 | 10/1995 | Schieve et al. | 395/183.03 |
| 5,469,463 | 11/1995 | Polch et al. | 395/183.02 |
| 5,483,637 | 1/1996 | Winokur et al. | 395/183.02 |
| 5,511,162 | 4/1996 | Hamada et al. | 395/183.02 |
| 5,539,877 | 7/1996 | Winokur et al. | 395/183.02 |
| 5,581,664 | 12/1996 | Allen et al. | 395/51 |
| 5,586,218 | 12/1996 | Allen | 395/10 |
| 5,630,025 | 5/1997 | Dolby et al. | 395/51 |
| 5,675,724 | 10/1997 | Beal et al. | 395/182.02 |
| 5,737,514 | 4/1998 | Stiffler | 395/182.04 |
| 5,768,496 | 1/1995 | Lidgett et al. | 395/183.01 |

FOREIGN PATENT DOCUMENTS

0 599 606 A2  1/1994  European Pat. Off. .

*Primary Examiner*—Robert W. Beausoliel, Jr.
*Assistant Examiner*—Pierre Eddy Elisca
*Attorney, Agent, or Firm*—Testa, Hurwitz & Thibeault, LLP

[57] ABSTRACT

A system and method for diagnosing faults that occur on a computer system. An executive unit loads an appropriate file set for a given fault from a database of file sets. An expert system unit analyzes the fault and uses the file set to determine a fact request to be asked or a remedy to be applied to the computer system. The executive unit directs a script management unit to run the fact request or remedy script selected by the expert system unit from the file set. If a response is given by a user or the computer system to the fact request, the executive unit returns the response to the expert system unit. The expert system unit engages in a further analysis based on the initial fault information and response received. The expert system makes additional fact requests if needed until a diagnosis is reached or the current file set is exhausted. File sets are linked in problem domains, and the executive unit can load another file set covering the same domain to continue the diagnostic process. If no local file sets are available, a remote unit determines if an appropriate remote file set is available and then retrieves it to continue the diagnostic process. An object management unit manages the file sets, which are structured into case-structured diagnostic sets, runtime files containing scripts and other information, and auxiliary files used by the scripts.

19 Claims, 8 Drawing Sheets

FACT RESOLUTION PROCESS

FIG. 8

SYSTEM AND METHOD FOR DIAGNOSING COMPUTER FAULTS

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The invention relates to systems and methods for diagnosing computer faults, and more particularly, to systems and methods for using an expert system for diagnosing computer faults.

BACKGROUND OF THE INVENTION

Computer based expert systems perform complex tasks such as aiding doctors and diagnosing illnesses, guiding engineers in controlling complex production processes and diagnosing and correcting computer failures. Typically, these expert systems employ knowledge bases that consist of a collection of data files loaded into a local memory device and made available to an expert system diagnostic computer program. The expert system diagnostic computer program employs the information stored in the data files to guide the user to a solution for the problem at hand. The knowledge base usually consists of a set of data files that contains information about the problem that the expert systems are working to solve. The diagnostic program will access the knowledge base to determine questions that are presented to a system user to collect information for diagnosing a particular problem.

To operate properly, the expert systems require knowledge bases that are complex and complete. The development of such expert system knowledge bases is a highly complex task. Each database contains information about the symptoms and characteristics that occur with a particular fault to provide for a proper diagnostic analysis of a particular problem. Moreover, for those expert systems that further attempt to correct the diagnosed faults, the knowledge bases contain information that instructs a user in correcting the diagnosed fault. Accordingly, these knowledge bases can be large and complex and contain different types of information; some types directed to the symptoms or fault, other types directed to solutions for a fault.

A problem that arises for many types of expert systems is that they depend upon a knowledge base that has current and accurate information. However, because it is a difficult task to update and maintain such complex databases of different types of information, the integration of new diagnostic information and solutions can be a complex and labor intensive procedure.

Accordingly, it is an object of the invention to provide systems and methods for performing expert system diagnostic analysis and resolution that employ a knowledge base that is segmented into specific file sets and domains that are easier to use, manage, update, and maintain.

SUMMARY OF THE INVENTION

This invention relates to an apparatus for diagnosing faults on a computer system. In one embodiment, the invention includes an expert system for analyzing faults, an executive unit in electrical communication with the expert system, and a database that contains diagnostic signals. The expert system analyzes a fault and the executive unit responds to this analysis by invoking a diagnostic signal in response to the analysis. The executive unit then receives a response to the diagnostic signal from the computer system.

In a further embodiment of the invention, the diagnostic signal is a question, fact request, or remedy, which the executive unit invokes in response to the analysis by the expert system. In one aspect of the invention, the database has facts and fact request information, and the executive unit makes a fact request in response to the analysis by the expert system.

In another embodiment, the database includes a diagnostic set having information related to faults and a related runtime database file having diagnostic scripts. In a particular embodiment the diagnostic set includes case structured information on faults, and the runtime database includes fact request and remedy scripts.

In a further embodiment, a remote unit retrieves a remote segment from a remote database server when the expert system fails to complete a diagnosis, and the expert system uses the remote segment to continue the analysis. In a particular embodiment, the remote segment is a remote file set.

The invention also relates to a method for diagnosing a fault with a computer system. The method includes the steps of the expert system analyzing a fault, the expert system selecting a diagnostic signal, the executive unit invoking the diagnostic signal, the executive unit receiving a response from the computer system to the diagnostic signal, and the expert system attempting to diagnose the fault based on the response.

In another embodiment of the invention, the method includes the repeated steps of the expert system analyzing the fault and/or response information, the executive unit invoking one or more additional diagnostic signals, and the executive unit receiving one or more additional responses, until the expert system can generate a remedy based on its analysis of the fault information and the responses. In a particular embodiment, a remote unit retrieves one or more additional diagnostic signals from a remote database server.

BRIEF DESCRIPTION OF THE FIGURES

The invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
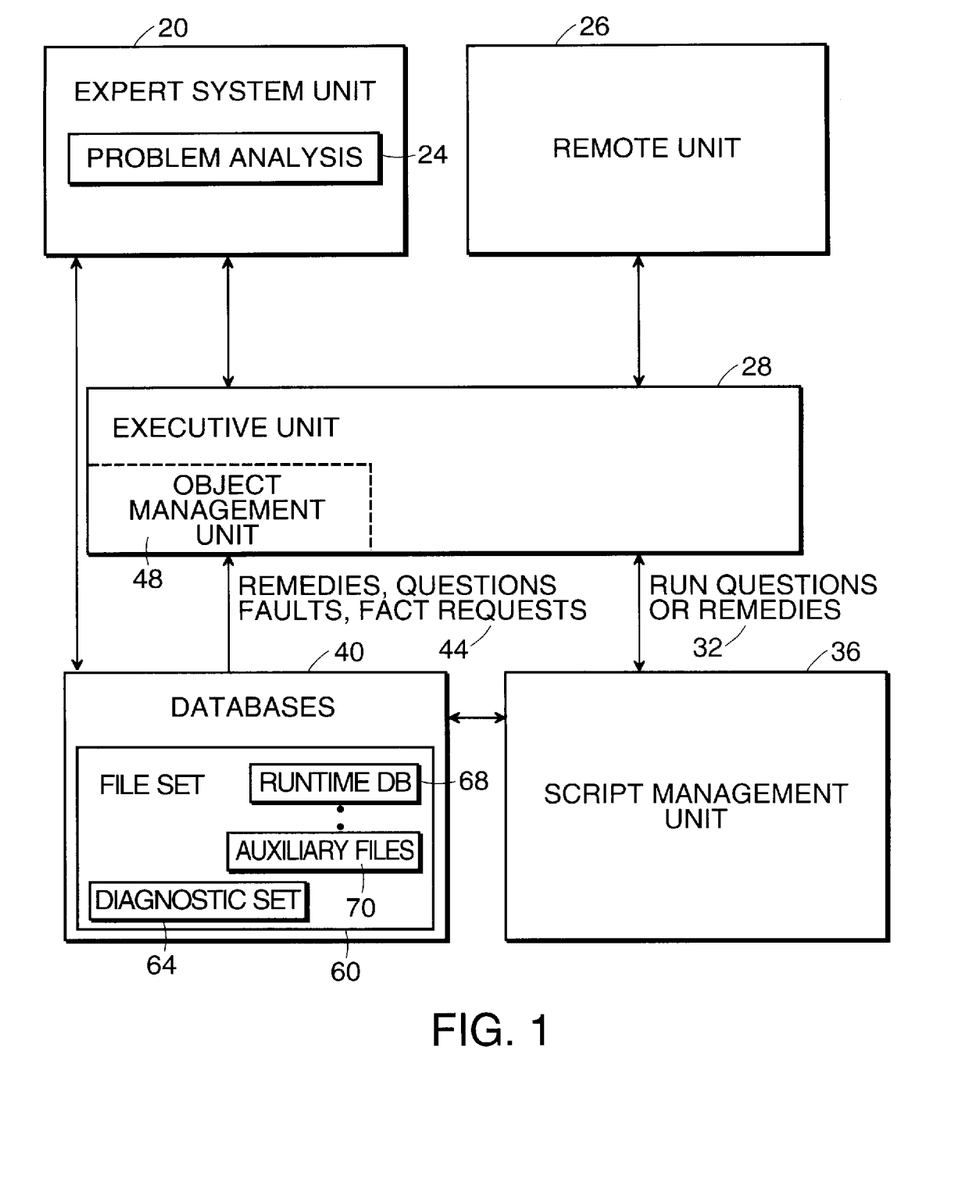
FIG. 1 is a high-level functional block diagram of one embodiment of the invention.

FIG. 1 depicts an embodiment of a system of the invention that includes an expert system unit (ESU) 20, a remote unit 26, an executive unit (EU) 28, a script management unit 36, and databases 40.

When a problem is encountered on a computer system, the executive unit 28 is informed of the problem. In a particular embodiment, a diagnostic application monitors error messages, traps them, and sends them to the executive unit 28 to inform it that there is one or more problems to be diagnosed. In another embodiment, a diagnostic application informs the user of the computer system that there is a problem and asks whether the user wants the problem to be diagnosed. Alternatively, the user invokes the diagnostic application and indicates that there is a problem to be diagnosed, and the diagnostic application informs the executive unit 28 of the problem.

Figure 2:
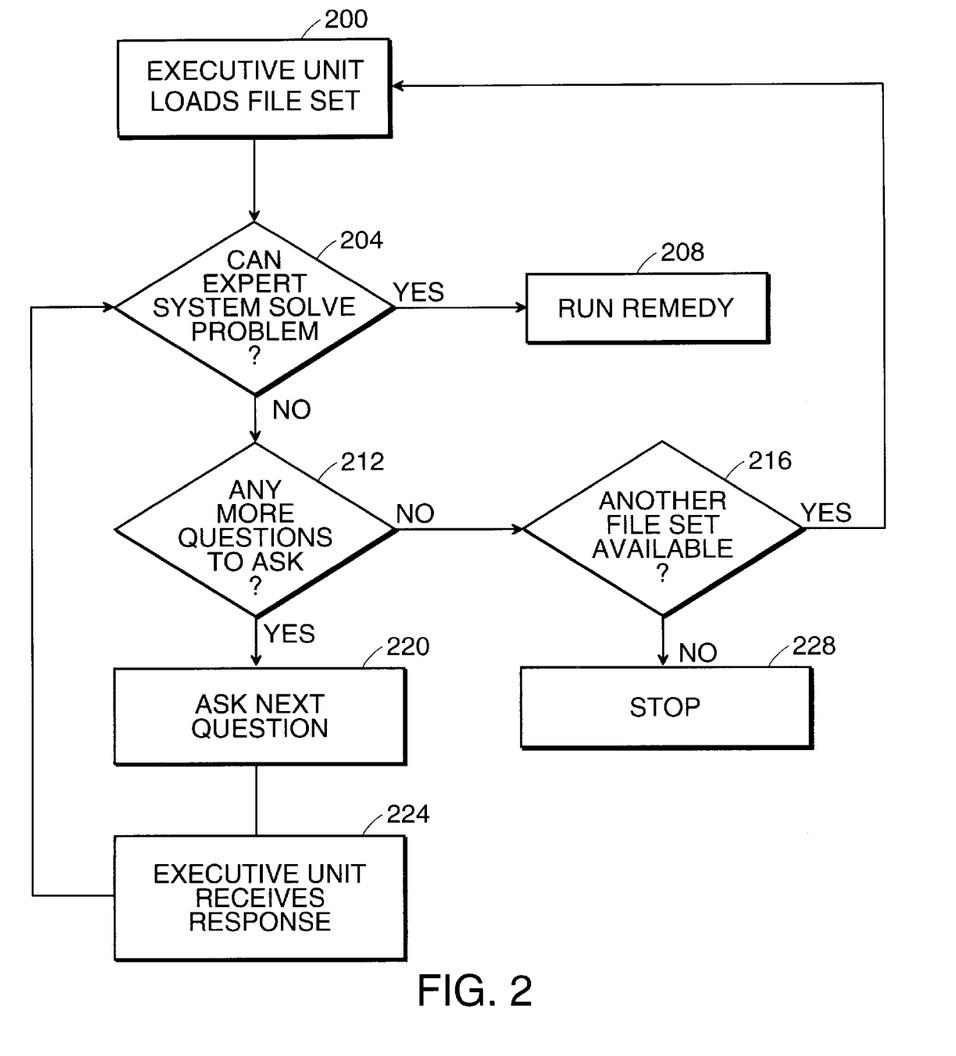
FIG. 2 is a high-level flow chart of an embodiment of the invention.

Referring to the embodiment depicted in FIGS. 1 and 2, the following is an overview of the process of diagnosing and correcting a problem, once it has been identified: The executive unit 28 selects an appropriate file set 60 for that problem from the databases 40 for the problem (step 200 in FIG. 2), and presents the problem to the expert system unit 20 for analysis (step 204). For example, if the problem is with the mouse, the executive unit 28 loads a file set 60 containing diagnostic information related to mouse problems. The expert system unit 20 either determines that the problem can be solved or that more information is needed and selects a diagnostic signal (remedy or question) that the executive unit 28 invokes from the databases 40. If the problem can be solved (step 204), the expert system unit 20 selects a remedy to the problem, and the executive unit 28 requests that the appropriate remedy script 32 be run (step 208). If more information is needed, the expert system unit 20 then selects a question (step 212). The expert system unit 20 then sends the question to the executive unit 28 (step 212), which sends it to the computer system or the user (step 220). The executive unit 28 receives the response or answer and then returns it to the expert system unit 20 (step 224), which then determines if a further question is needed (steps 204 and 212) or indicates to the executive unit 28 that a remedy script should be run (step 208).

If no remedy is found, the executive unit 28 loads another file set if needed (steps 216 and 200). The file set is found locally or is obtained through a remote unit 26 (see also FIG. 8). The expert system unit 20 then repeats the cycle of questions until a remedy is reached (step 208). For example, if a specific application often produces mouse problems, the executive unit 28 may load the file set 60 for this application, if the user is running it. If no remedy is reached, the user can reclassify the problem in a new problem domain, and the executive unit 28 can load another file set 60 (steps 216 and 200) for the new problem domain as described below.

Referring to the embodiment of the invention shown in FIG. 1, the executive unit 28 provides coordination for the expert system unit 20, the remote unit 26, the databases 40, and the script management unit 36. The executive unit 28 includes an object management unit 48, which manages objects in the databases 40. In one embodiment these objects include diagnostic set references, script objects, image objects (bitmaps), and text objects. In alternate embodiments, the databases 40 are divided into database segments (local segments), diagnostic signals, or files. In one embodiment, the databases 40 includes a case-structured knowledge base. In a particular embodiment, the databases 40 contains file sets 60, which constitutes a knowledge-base module about a particular problem area, and each file set 60 contains a diagnostic set 64, a runtime database 68, and, optionally, an auxiliary file 70. The databases 40 are discussed in further detail below.

The script management unit 36 manages and executes scripts when directed to do so by the executive unit 28. The scripts includes investigative scripts that ask a question or seek information as a result of the analysis 24 by the expert system unit 20. The scripts include remedy scripts that the script management unit 36 executes to solve a problem on the computer system. In addition to running the scripts, the script management unit 36 also communicates the results back to the executive unit 28.

The executive unit 28 uses the remote unit 26 to load data from a remote database on a remote computer system, a remote database server, or a remote database storage device. In alternate embodiments, the remote database is divided into database segments (remote segments), diagnostic signals, or files; alternatively, the files are organized as file sets 60. The remote database can include remedy components used by a remedy script when the expert system unit 20 finds a remedy for the problem. The remote unit 26 can also download file sets 60 not present locally that provide additional diagnostic information about a problem. In one embodiment, the remote unit 26 uses an FTP connection over a network to access the remote database server. Alternatively, the remote unit 26 can use any other commonly used communications protocol to connect to the remote database server.

The expert system unit 20, also known as an inference engine, is an expert system processing device that analyzes factual information from which to draw a conclusion, or inference, from that factual information. Any such inference engine can be employed by the present invention for performing the diagnostic analysis. For example, the inference engine can be any suitable inference-based expert system unit, either developed specifically for use with the present invention or a commercially available product. Suitable commercial products include API-DX from Knowledge Industries, Menlo Park, Calif., and CBR Express® from Inference Corporation, Novato, Calif. Typically, such inference engines are mathematical processors that do an analysis to draw an inference to the existence of a certain fact, given a set of information that is understood to have a relationship to the existence of this known fact.

Figure 3:
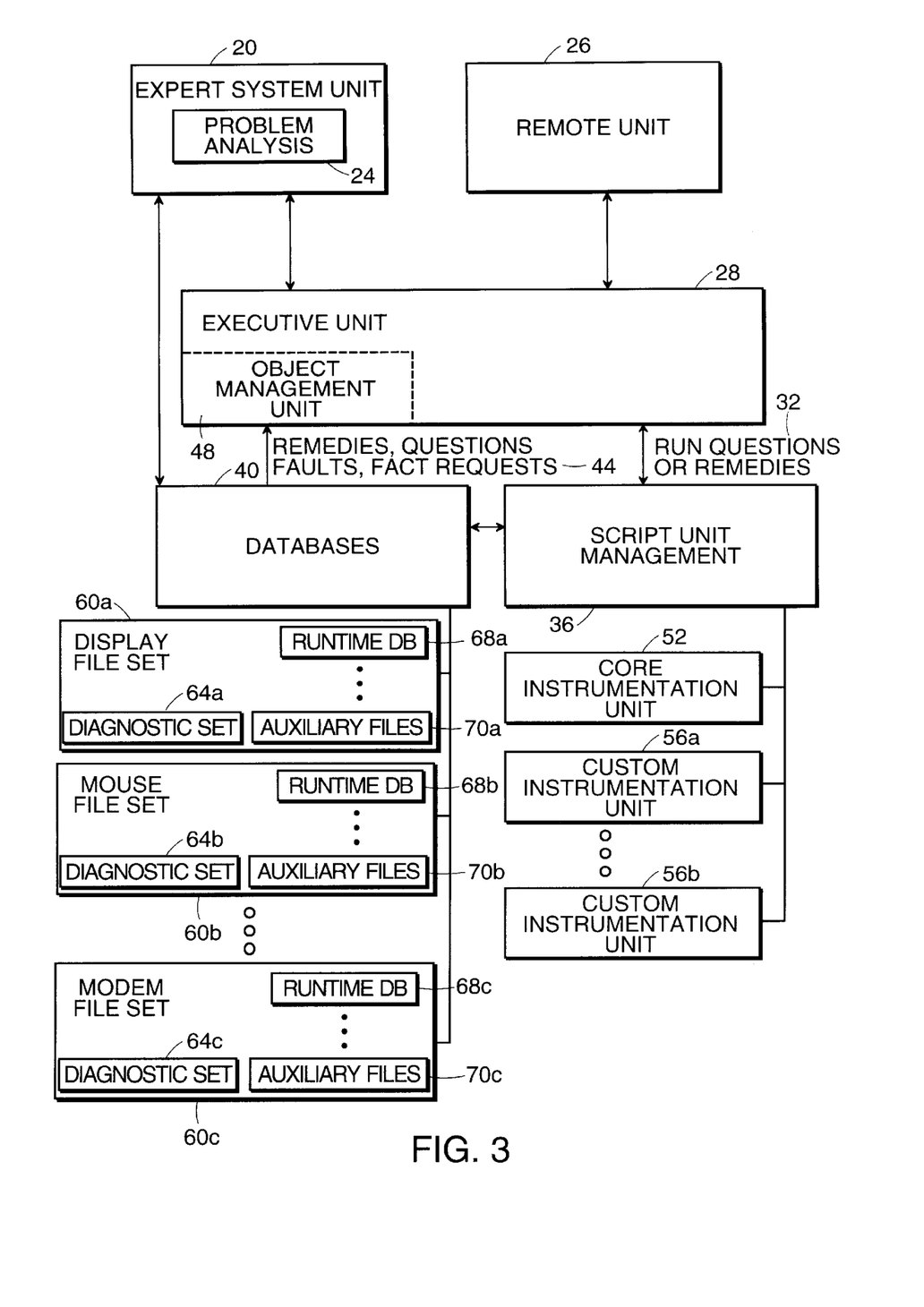
FIG. 3 is a more detailed functional block diagram of another embodiment of the invention.

The embodiment of the invention in FIG. 3 shows several file sets, shown generally as 60, in the databases 40. The embodiment shows a display file set 60a for problems related to the display of the computer system, a mouse file set, 60b, for problems related to a mouse device used with the computer system, and a modem file set 60c, for problems relating to a modem connected to the computer system for communications to a network or other computer systems. In another embodiment of the invention, a file set 60 covers more than one problem domain; in other words, each file set 60 can include cases (faults) from more than one problem area. The problem domains that the file set 60 covers are listed in the domain coverage table 80 in the file set 60 (discussed in more detail below).

The embodiment of the invention shown in FIG. 3 also shows a core instrumentation unit 52, which provides low-level instrumentation functions. The instrumentation functions are used by the scripts to gather diagnostic information about the computer system. The instrumentation functions mainly affect operating system, software, and hardware configuration. The script management unit 36 also uses custom instrumentation units, shown generally at 56. The custom instrumentation units 56 are provided by OEMs (original equipment manufacturers) who provide custom software or hardware components to be used with the computer system. The custom instrumentation units 56 provide low-level instrumentation functions that map to the custom software or hardware components provided by an OEM.

Figure 4:
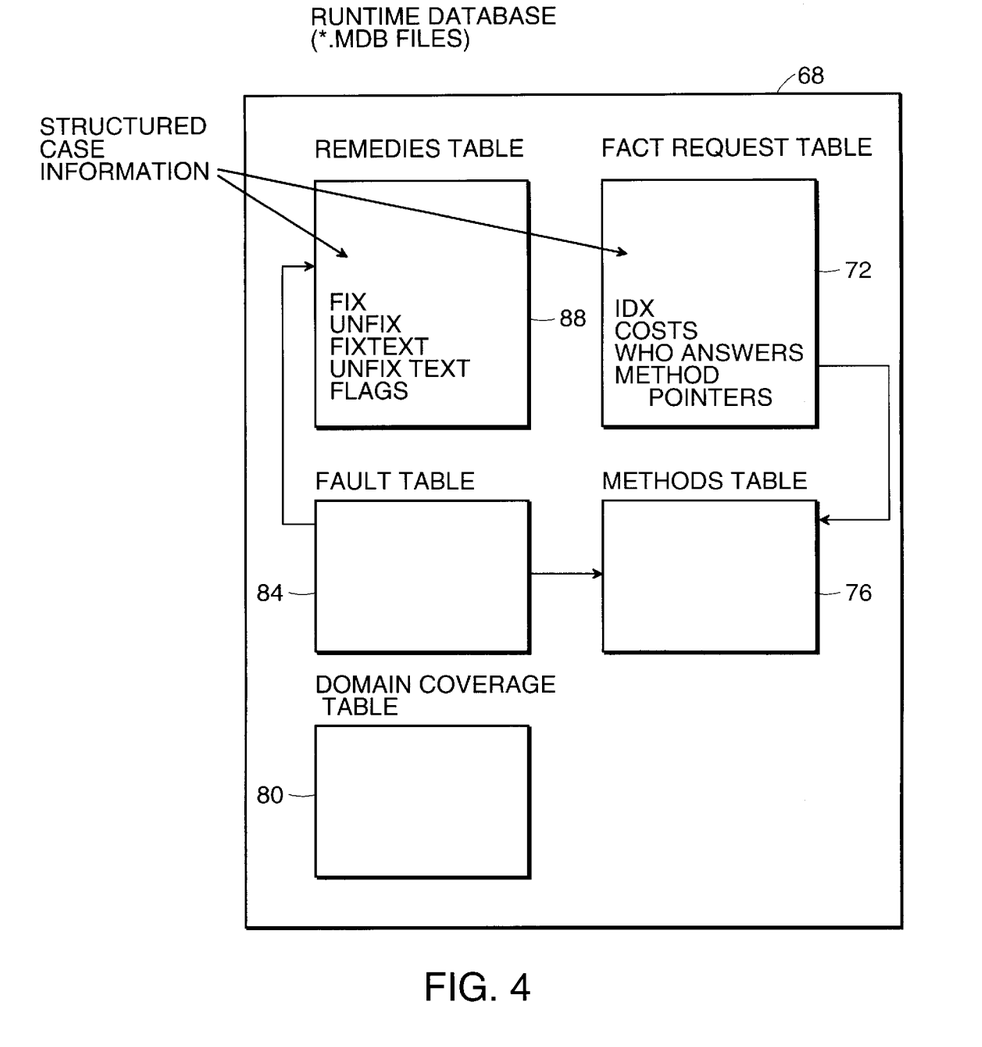
FIG. 4 is a pictorial representation of an embodiment of the runtime database file shown in the embodiment of the invention of FIG. 3.

FIG. 4 shows the runtime database file 68 of the embodiment of the invention shown in FIG. 3. In a specific embodiment, the runtime database files 68 have the file extension *.MDB. The runtime database 68 contains structured case information used by the expert system unit 20, including diagnostic signals, which include diagnostic scripts such as remedy and question scripts, for each case or problem to be diagnosed. A structured case has several components: a fault (problem), causes (facts), questions (fact requests), and remedies. The fault is a problem with the computer system and/or one of its components. A fault can have one or more causes. For example, a cause (fact), such as the printer being unplugged, results in a problem, such as the printer not working. Each cause has one or more questions associated with it, that ask either the computer system or the user for more information. Each question has a specific investigative script associated with it that gathers the information from the computer system or asks the user to provide an answer. Each fault has a remedy associated with it, and each remedy has a remedy script. Once the expert system unit 20 has determined what the cause of the problem is, the expert system unit 20 indicates to the executive unit 28 that the corresponding remedy script should be executed by the script management unit 36 (see FIG. 3).

In the embodiment of the runtime database file 68 shown in FIG. 4, the remedy table 88 contains information on remedies including fix, unfix, fixtext, and unfixtext entries. The remedy table 88 also contains flags associated with the remedies. The fact request table 72 (questions table) contains several data fields, including pointers to methods, which are the investigative or question scripts, and costs, which are the costs of asking different types of questions. For example, a script has a low cost if it asks the computer system for information, such as what is the current configuration of the computer system, without asking the user to do anything. A script that asks the user to physically remove the cover of the computer system to determine an answer has a high cost. The expert system unit 20 chooses the script that has the most value to the diagnosis.

A script is passed by the executive unit 28 to the script management unit 36, which invokes the methods. In one embodiment of the invention, the script is implemented in BasicScript® from Summit Software, Jamesville, N.Y. In alternate embodiments, the script can be implemented in a programming language such as C, an object oriented programming language such as C++, or another object oriented programming language. Alternatively, the invention uses a variety of scripts from a defined set of scripting languages. Auxiliary files 70 are additional files that a script in the runtime database 68 uses when the script is executed. For example, a script can display an image that is stored in an auxiliary bitmap file or text information that is stored in an auxiliary text file. Another example of an auxiliary file 70 is an executable file invoked by a script that installs new or replacement software on the computer system in order to solve a problem.

The following is an example of a fact request script used in one embodiment of the invention:

---

```
'Copyright 1995–96 SystemSoft Corporation
'All Right Reserved
'Group      :   September
'Domain     :   Mouse
'Remedy #   :
'Filename   :   Script\Mouse\Question\Mousedrv.txt
'Question   :   What type of mouse driver is installed on your system.
Sub Main
    Dim Hardware$ ( )
    Dim Path$ ( )
    Class$ = "Mouse"
    NumDevices = GetHardWareClass(Hardware$, Path$, Class$)
    SubKey$ = SysRegReadStringValue(Path$ (0), "Driver")
    Key$ =
    "LOCAL_MACHINE\System\CurrentControlSet\Services\Class\"+
    Subkey$
    Value$ = SysRegReadStringValue(Key$, "DriverDesc")
    EndScript Value$
End Sub
```

---

The expert system unit 20 has analyzed a problem with the mouse and determines that it needs more information about the mouse driver that is installed on the computer system and that a fact request should be run to determine the mouse driver type. The expert system unit 20 passes the request on to the executive unit 28, which then directs the script management unit 36 to run this fact request script. The fact request script reads a string that indicates what type of mouse driver is installed on the computer system, and then returns this string. The executive unit 28 then passes the answer back to the expert system unit 20, which uses the fact (the mouse driver type) to do further diagnostic analysis of the problem with the mouse.

In this example, the information on the mouse driver type can be determined without asking the user for any information. Other scripts need to ask the user for information about the computer system and thus display questions to the user on the computer system monitor or display.

The following is an example of a remedy script used in one embodiment of the invention:

---

```
'Copyright 1995–96 SystemSoft Corporation.
'All rights reserved.
'Case# : SYS447
    'Remedy : Remove the registry entries that refer to previous pointing devices,
    'remove any entries in Device Manager that refer to previous pointing
    'devices & reboot to allow the system to detect the new mouse.
    'Look for and remove the following Registry entries:
    '(Note: The first Registry key will almost always be availible.)
    '** LOCAL_MACHINE\System\CurrentControlSet\Services\Class\Mouse\<nnnn>
    '- where <nnnn> is a 4-digit number starting at 0000
```

```
'** LOCAL_MACHINE\Enum\Root\Mouse\<nnnn>
'- where <nnnn> is a 4-digit number starting at 0000
'** LOCAL_MACHINE\Enum\SERENUM
'** LOCAL_MACHINE\Software\Logitech\Mouseware
'Return one of the following values:
'Yes, No
Sub Main
  crlf$ = Chr(10)+Chr(13)
  'Set list of all Main Keys
  MainKey1$ = "LOCAL_MACHINE\System\CurrentControlSet\Services\Class\Mouse"
  MainKey2$ = "LOCAL_MACHINE\Enum\Root\Mouse"
  MainKey3$ = "LOCAL_MACHINE\Enum"
  SubKey3$ = "SERENUM"
  MainKey4$ = "LOCAL_MACHINE\Software\Logitech"
  SubKey4$ = "Mouseware"
  'Check for MainKey1$ then delete
    If (SysRegCmp(MainKey1$, " ")) Then
        DIM SubKey1$(100)
        Count = SysRegReadKey(SubKey1$, MainKey1$)
        'If Subkeys Exist then delete them
        If (0 < Count) Then
            For X=0 To Count-1
                Status = SysRegDeleteKey(MainKey1$,SubKey1$(X))
            Next X
        End If
    End If
  'Check for MainKey2$
  If (SysRegCmp (MainKey2$, "")) Then
        DIM SubKey2$(100)
        Count = SysRegReadKey(SubKey2$, MainKey2$)
        'If Subkeys exists then delete them
        If ( 0 < Count) Then
            For X=0 To Count-1
                Status = SysRegDeleteKey(MainKey2$,SubKey2$(X))
            Next X
        End If
  End If
  'Check for MainKey3$\SubKey3$ then delete
  If (SysRegCmp(MainKey3$ + "\" + SubKey3$, "")) Then
        Status = SysRegDeleteKey(MainKey3$, SubKey3$)
  End If
  'Check for Mainkey4$\SubKey4$ then delete
  If (SysRegCmp(MainKey4$ + "\" + SubKey4$, "")) Then
        Status = SysRegDeleteKey(MainKey4$, SubKey4$)
  End If
  'Get the list of Hardware
        DIM Paths$()
        DIM HardWare$()
        NumHW = GetHardWareClass(HardWare$, Paths$, "")
  'Find the Mouse/Pointer entries in the Hardware list
  MouseNum = 0
  DIM FullPath$(25)
  For X=0 To NumHW-1
        If (0 < InStr(1, HardWare$(X), "Mouse", 1))
            OR (0 < InStr(1, HardWare$(X), "EasyBall", 1))_
        Or (0 < InStr(1, HardWare$(X), "TrackBall", 1))
            Or (0< InStr(1, HardWare$(X), "BallPoint", 1))_
        Or (0 < InStr(1, HardWare$(X), "AcuPoint", 1 )) Then
            FullPath$(MouseNum) = Paths$(X)
            MouseNum = MouseNum + 1
        End If
  Next X
  'Parse out the last key in the path
  DIM MousePath$(MouseNum)
  DIM SubKey$(MouseNum)
  For X=0 To MouseNum-1
  MousePath$(X) = ""
  Num = ItemCount(FullPath$(X), "\")
        For Y=0 To ItemCount(FullPath$(X),"\")-1
            Index = InStr(FullPath$(X), "\")
            MousePath$(X) = MousePath$(X) + Left$(FullPath$(X), Index)
            FullPath$(X) = Right$(FullPath$(X), Len(FullPath$(X))-Index)
        Next Y
        MousePath$(X) = Left$(MousePath$(X), Len(MousePath$(X))-1)
        SubKey$(X) = FullPath$(X)
  Next X
  'Remove all Mouse\Pointer entries in Device Manager
  For X=0 To MouseNum-1
        Remove = SysRegDeleteKey(MousePath$(X), SubKey$(X))
  Next X
```

-continued

```
'Reboot to detect new mouse
AskReboot
End Sub
```

This script provides a remedy for a problem with a mouse. The expert system unit 20 has analyzed a problem with the installation of a new mouse on a PC computer system. The expert system unit 20 has determined that the Microsoft® Windows® 95 Registry on the computer system must be updated to provide the correct information in the Registry for the new mouse. If the Registry information is not correct, the computer system will not be able to communicate with the new mouse.

The methods table 76 is a table of the script objects available for each case. The fault table 84 contains identification and other information on the fault (problem) for each case, including the probability of the fault occurring. The domain coverage table 80 contains information on the problem area or domain, and related domains. For example, if the XYZ application is known to have problem sometimes with the mouse, then the XYZ application and mouse domain are linked in the domain coverage table 80. If the questions in the mouse file set 60b are all asked without solving a problem with the mouse, then the executive unit 28 loads the XYZ application file set so that the expert system unit 20 can continue the investigation of the problem.

In another embodiment of the invention, a file set 60 can have cases from more than one problem domain, in which case the domain coverage table 80 lists all the domains covered by cases in the file set 60. For example, the XYZ application file set can have cases that cover problem domains for the mouse, the graphic display to the user, and other areas of the application. The domain coverage table 80 in the XYZ application file set lists all these problem domain areas. When all the cases in a file set 60 have been exhausted and the executive unit 28 looks for another file set, the executive unit 28 checks the domain coverage table 80 in each file set 60 to select a file set 60 that has cases in the relevant problem domain. The executive unit 28 then indicates to the expert system unit 20 that the expert system unit 20 can then use the selected file set 60 in its analysis.

Figure 5:
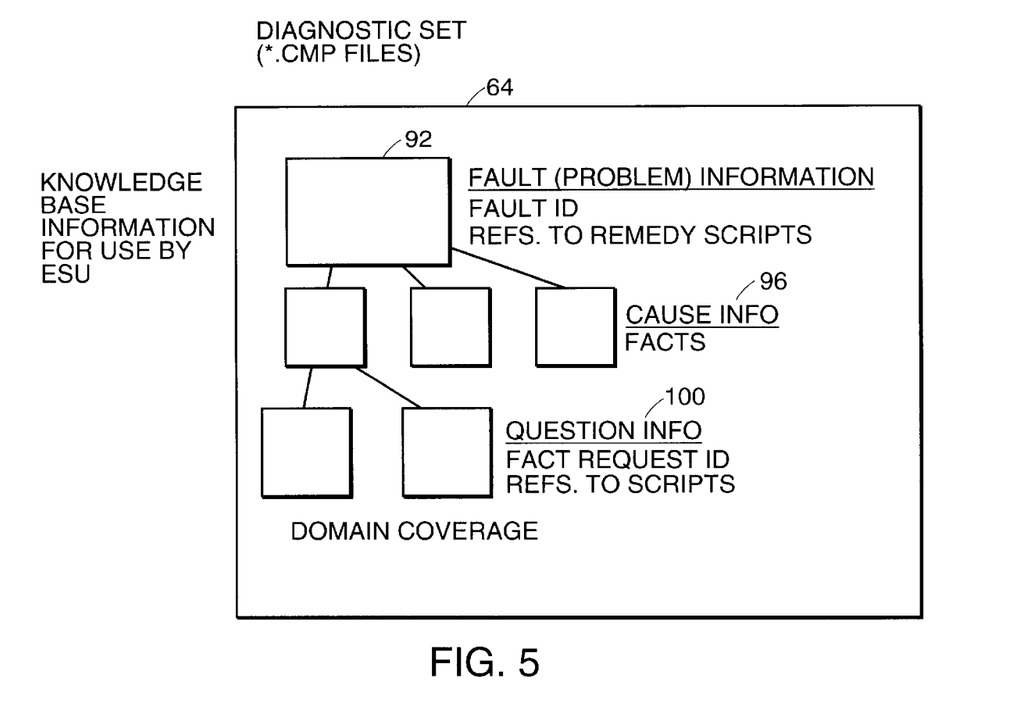
FIG. 5 is a pictorial representation of an embodiment of the diagnostic set shown in the embodiment of the invention depicted in FIG. 3.

FIG. 5 shows a diagnostic set 64 of the embodiment of the invention shown in FIG. 2. In this embodiment of the invention, diagnostic sets 64 have the file extension *.CMP. The diagnostic set 64 contains case-structured, knowledge-base information including information on faults (problems) 92, and questions (fact requests) 100 in a native data format for use by the expert system unit 20 when performing a case-structured analysis. Fault information 92 contains a fault identifier and references to remedy scripts contained in the runtime database 68. Question (fact request) information 100 has references to question, query, or investigative scripts contained in the runtime database 68.

In one embodiment of the invention, the *.CMP file is a text file that represents a set of faults and their associated questions. The following example is an excerpt from a sample *.CMP file:

```
'Copyright 1995–96 SystemSoft Corporation.
'All rights reserved.
Case SYS326
{
```

-continued

```
description: "When the XCOPY command is used, files with long file-
   names may not be copied, because \"Prevent MS-DOS based
   programs from detecting Windows"\ is enabled.";
prior: 0.10;
factlist:
{
   SYS352:    "DOS";
   SYS1155:   "NO";
   SYS4099:   "Problems Using Certain DOS Software";
   SYS4101:   "Problems with a specific DOS command";
   SYS4689:   "Xcopy";
   SYS4690:   "No";
   SYS4692:   "Orig", "OSR1", "OSR2", "OSR2.1", "OSR3";
}
}
FR SYS4689
{
   description: "With which of the following DOS commands are you
       having a problem?";
   ui: yes;
   cost: 10.00;
   values:    "Diskcopy",
              "Xcopy",
              "Undelete";
}
FR SYS4690
{
   description: "When you used the XCOPY command, were the files
       with long filenames (filenames with more than 8 characters
       in their names or more than 3 characters in their
       extensions) copied?"
   ui: yes;
   cost: 10.00;
   dep: "SYS4689";
   values:    "Yes";
              "No";
}
```

The example first shows the fault information 92 for this case and related fact information 96. The descriptions may be optionally omitted from a file, since they are not used by the expert system unit 20. The case has a name, "SYS326"; a prior weight, "0.10"; and a list of associated facts. Each associated fact is specified as the name of a fact request, followed by a list of acceptable answers. In the current implementation, the prior weight is "0.10", but the weight could be used in the future to distinguish more common cases from less common ones, making it faster to diagnose the common ones.

The example next shows fact request information 100 for two fact requests. The first fact request has a name, "SYS4689"; a "ui: yes" entry that indicates that the user is asked this question; a cost of answering the question; and a set of acceptable values. The cost is in arbitrary units; only ratios of costs are used in determining which questions to answer. The expert system unit 20 uses the cost information to do a cost-benefit analysis when determining what fact request should be asked next (as discussed in more detail later). That second fact request, named "SYS4690," has, in addition, a "dep" field that indicates that it is logically dependent on SYS4689. The expert system unit 20 uses the dependency information to insure that the SYS4689 fact request has been asked and an answer returned, before asking SYS4690.

Figure 6:
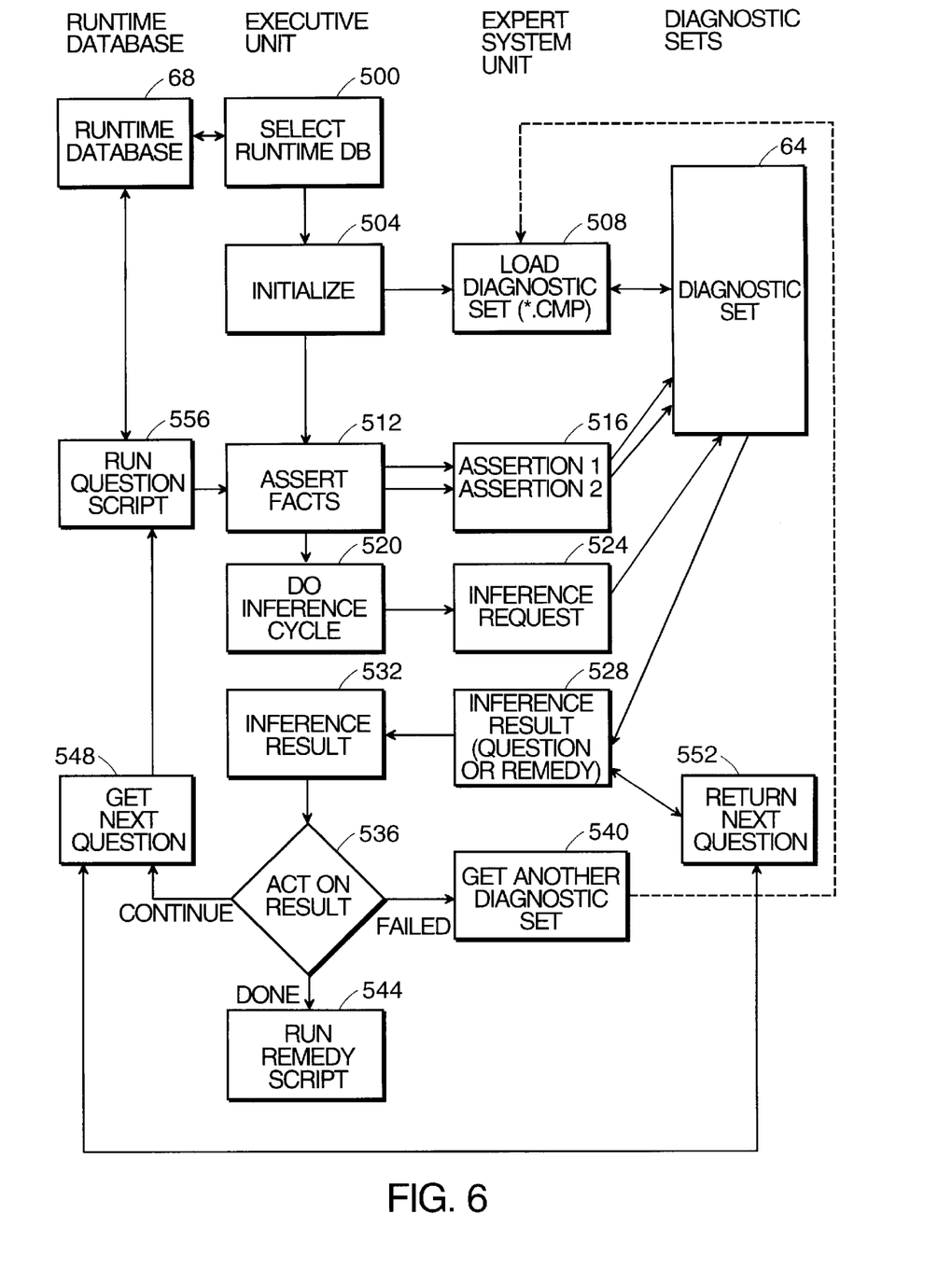
FIG. 6 is a flow chart of an embodiment of a diagnostic process according to the invention.

FIG. 6 is a flow chart of an embodiment of the diagnostic process according to the invention. When a problem (fault)

occurs in the computer system, the executive unit 30 selects the runtime database file set 60 corresponding to that fault, based on the information it has received from the computer system or the user about the fault (step 500). The executive unit 30 initializes associated diagnostic components such as the expert system unit 20 and the script management unit 36 (step 504) and then loads the corresponding diagnostic set 64 (step 508) for the expert system unit 20. The diagnostic set 64 is found locally or is obtained through the remote unit 26. The executive unit 30 then asserts the facts known about the fault (step 512) as assertions (step 516) communicated to the expert system unit 20. The executive unit 30 initiates an inference cycle (step 520) and makes an inference request (step 524) to the expert system unit 20. The expert system unit 20 processes the facts asserted about the fault in light of the knowledge base in the diagnostic set 64 and produces an inference result (step 528) which the expert system unit 20 returns to the executive unit 30. The inference result indicates "no result" or includes a diagnostic signal indicating either a request for more information (question or fact request) or a proposed remedy, respectively.

The executive unit 30 then acts on the inference result (step 536). If the inference result is a remedy, the executive unit 30 obtains the corresponding remedy script object from the runtime database 68 and then requests the script management unit 36 to run the remedy script (step 544). If the inference result is a request for information, then the executive unit 30 obtains the next question (step 548 and 552), obtains the corresponding fact request script object from the runtime database 68 and directs the script management unit 36 to run the fact request script (step 556) to get more information from the computer system or the user. The executive unit 30 then asserts the answer as a fact (step 512) to the expert system unit 20 (step 516), and the inference cycle is started again (step 520). If the inference result failed, that is, the expert system unit 20 has no remedy or no further questions, then the executive unit 30 determines if there is another related diagnostic set 64 in the problem domain. If so, the diagnostic set 64 is loaded for the expert system unit 20 (step 508). Then the fact assertion and inference cycle can begin again (steps 512–532).

Figure 7:
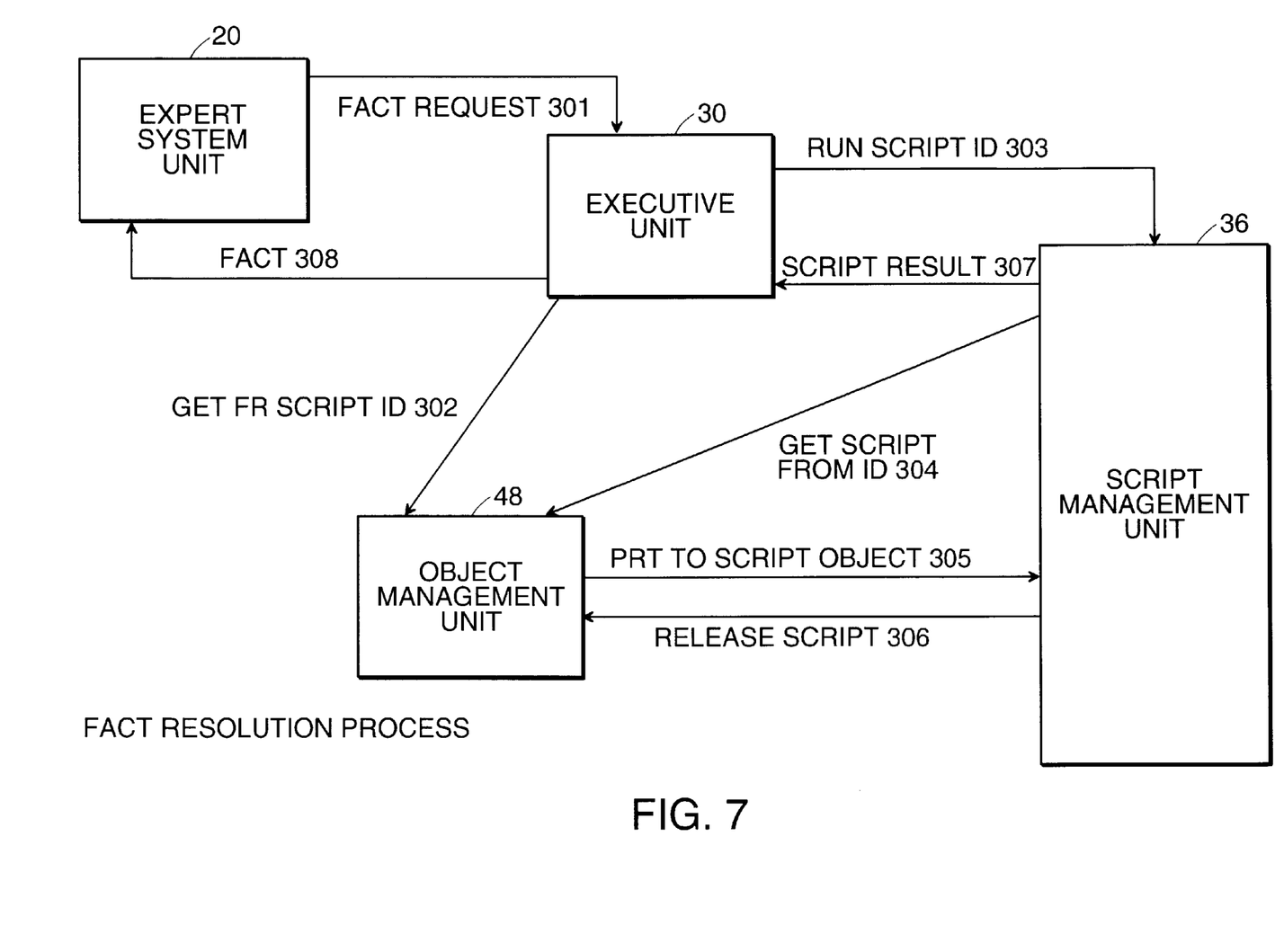
FIG. 7 is a flow chart of an embodiment of the fact resolution process according to an embodiment of the invention.

The fact resolution process of one embodiment of the invention is shown in FIG. 7. If the expert system unit 20 needs additional information to complete its analysis of a problem, the expert system unit 20 identifies a fact request by its ID (identification code) and requests that it be asked to the computer system or the user (step 301). The executive unit 30 make a request to the object management unit 48 to get the fact request script from the databases 40 based on the fact request ID (step 302). The executive unit 30 instructs the script management unit 36 to run the fact request script (step 303). The script management unit 36 asks the object management unit 48 to load the script object in memory (step 304), and the object management unit 48 returns a pointer to the script object (step 305). The script management unit 36 runs the script and then releases the script object (step 306). The script management unit 36 returns the result to the executive unit 30 (step 307). The executive unit 30 takes the result and passes it to the expert system unit 20 to instantiate a fact from the result (step 308). The expert system unit 20 then uses the fact in its analysis, leading to another fact request, a proposed remedy, or loading a new diagnostic set 64 if the analysis based on the current diagnostic set 64 is exhausted.

Figure 8:
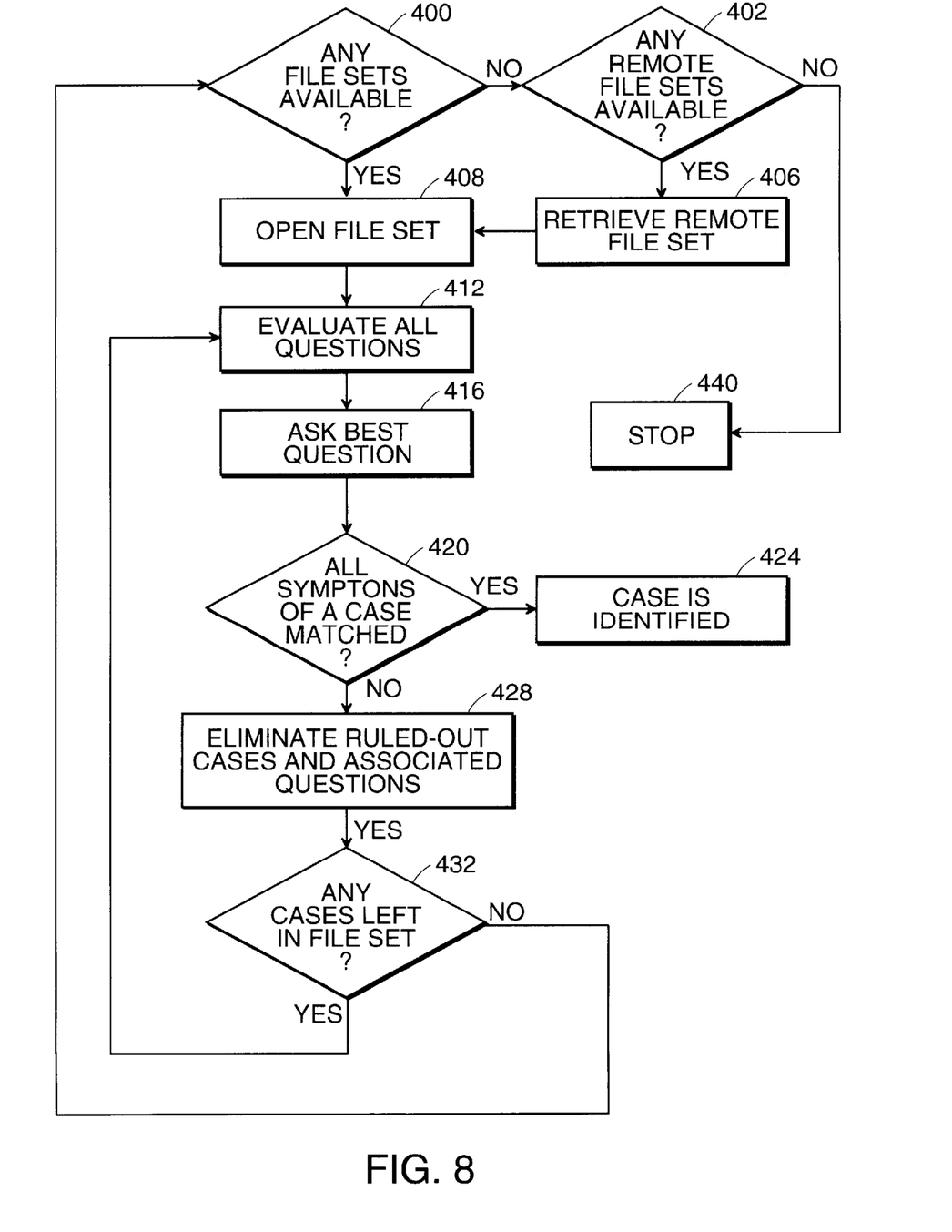
FIG. 8 is flow chart showing the file set evaluation process for an embodiment of the invention.

The analysis of a file set 60 for one embodiment of the invention is shown in FIG. 8. The first step is to determine if any file sets 60 are available related to the problem reported to the executive unit 30 and the expert system unit 20 (step 400). If there are no file sets 60 available locally, then the executive unit 30 uses the remote unit 26 to determine if there are any remote file sets available in the problem domain (step 402). If there are no file sets available locally or remotely, then the analysis stops (step 440). If a remote file set is available, then the remote unit 26 retrieves the remote file set (step 406). If an appropriate local or downloaded remote file set 60 is available, then the file set 60 is opened (step 408). The expert system unit 20 evaluates all of the questions in the file set 60 (step 412) and performs a cost-benefit analysis to evaluate the costs of the questions to determine the best question (step 416). The question is asked and the answer returned to the expert system unit 20, which then determines if all the symptoms of a case are matched (step 420). If all symptoms are matched, then a specific problem (case) is identified (step 424) and the expert system unit 20 can propose a remedy. If all the symptoms of a case are not matched, then the expert system unit 20 eliminates any cases that have already been ruled out and the questions associated with those cases (step 428). The expert system unit 20 then determines if there are any cases left in the file set 60 (step 432). If any cases are left in the file set 60, then the expert system unit 20 returns to the step of evaluating all the remaining questions (step 412) to determine the best question (step 416). If there are no cases left in the file set 60, the next step is to determine if there are any other related or linked file sets 60 (step 400) to be opened (step 408).

In one particular embodiment of the invention, the expert system unit 20 analysis shown generally in FIG. 8 proceeds as follows: The expert system unit 20 reads in an entire file set 60, and builds an in-memory network with the same logical structure as described by the file set 60. All further diagnostic operations are performed on the in-memory network. When a fact is asserted, cases containing the associated fact request are affected. If a case contains the answer (returned from the computer system or user) among its list of acceptable answers for that fact request, the case is marked as having that question answered correctly; otherwise, the case is ruled out (step 428). When all the questions for a case are answered correctly, that case is considered to have been diagnosed (steps 420, 424). When a fact is retracted, the above procedure is reversed.

When top questions or top faults are requested, the expert system unit 20 first computes a weight for each case, based on the case's prior weight and the number of questions left to be answered for that case. Each unanswered fact request that is not dependent on any other fact request is then assigned a weight, based on the weights of all cases that contain this fact requests or any fact requests directly or indirectly dependent on this fact request. The fact request with the greatest weight is considered the top fact request and is the next to be asked (steps 412, 416). In the event of a tie, one of the tying fact requests is chosen arbitrarily.

If there are no cases left that have not been ruled out, diagnosis is considered to have failed in this file set 60, and the lists of top faults and top fact requests are empty. The next step is to determine if another file set 60 is available that covers the same problem domain (step 400), and open that file set 60 (step 408). If no other file set 60 is available in the problem domain, then the user is asked to select another problem domain.

In a particular embodiment of the invention, the expert system unit 20 implements a standard set of interface functions to support the diagnostic process described above. These functions include loading a new file set; unloading the currently-loaded file set; asserting a fact (i.e., a particular answer to a particular question); retracting a fact (causing it not to be asserted); returning the set of top (most valuable) questions; returning the set of top (most likely) faults; running a cycle of inference (and declaring whether a fault has been diagnosed, diagnosis has failed in this file set, or diagnosis may continue); rendering a particular fault ineligible for further consideration, because its remedy has been tried and has failed to correct the problem; and reversing the action of rendering a fault ineligible, as above.

Having described the preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. An apparatus for diagnosing and remedying at least one fault associated with a computer system, said apparatus comprising:

an expert system analyzing said at least one fault;

an executive unit in electrical communication with said expert system; and a database in electrical communication with said expert system and said executive unit, wherein said database comprises at least one diagnostic signal and said at least one diagnostic signal comprises at least one remedy, wherein said executive unit invokes a first said at least one diagnostic signal directed to said computer system in response to said expert system analyzing said at least one fault, and wherein said executive unit receives at least one response from said computer system to said first said at least one diagnostic signal, and said executive unit invokes said at least one remedy directed to said computer system, in response to said expert system analyzing at least one of said at least one fault and said at least one response.

2. An apparatus as in claim 1 wherein said at least one diagnostic signal comprises at least one question, said executive unit invoking said at least one question directed to said computer system, in response to said expert system analyzing at least one of said at least one fault and said at least one response.

3. An apparatus as in claim 1 wherein said at least one diagnostic signal comprises at least one fact and at least one fact request, said executive unit invoking said at least one fact request directed to said computer system, in response to said expert system analyzing at least one of said at least one fault and said at least one response.

4. An apparatus as in claim 1 wherein said executive unit receives at least one response to said at least one diagnostic signal from a user of said computer system.

5. An apparatus as in claim 1 wherein:

said database comprises objects; and said executive unit comprises an object management unit.

6. An apparatus as in claim 1 wherein:

said at least one diagnostic signal comprises at least two questions;

said expert system determines a selected question from said at least two questions using a cost-benefit analysis; and said executive unit invokes said selected question directed to said computer system.

7. An apparatus as in claim 1 wherein:

said database comprises a case structured knowledge base;

said at least one diagnostic signal comprises said at least one fault, at least one fact, at least one fact request, and at least one remedy; and said expert system performs a case structured analysis, in response to at least one of said at least one fault and said at least one response.

8. An apparatus as in claim 1 wherein:

said database comprises at least one file set, said at least one file set comprises at least one diagnostic set comprising fault information for said at least one fault, and at least one runtime database file comprising at least one diagnostic script; and said executive unit invokes said at least one diagnostic script directed to said computer system, in response to said expert system analyzing at least one of said at least one fault and said at least one response.

9. An apparatus as in claim 8 wherein:

said at least one runtime database file comprises said at least one fault, at least one fact, at least one fact request script, and at least one remedy script;

said at least one diagnostic set comprises at least one fault, at least one reference to said at least one fact request script, and at least one reference to said at least one remedy script; and said executive unit invokes said at least one fact request script or said at least one remedy script directed to said computer system, in response to said expert system analyzing at least one of said at least one fault and said at least one response.

10. An apparatus for diagnosing at least one fault associated with a computer system, said apparatus comprising:

an expert system analyzing said at least one fault;

an executive unit in electrical communication with said expert system; and a database in electrical communication with said expert system and said executive unit, wherein said database comprises at least one diagnostic signal, a first file set and a second file set, said first file set comprising a first global domain coverage table comprising a first reference to a problem domain, said second file set comprising a second domain coverage table comprising a second reference to said problem domain, wherein said executive unit invokes a first said at least one diagnostic signal directed to said computer system in response to said expert system analyzing said at least one fault, and said executive unit receives at least one response from said computer system to said first said at least one diagnostic signal, and wherein said executive unit loads said second file set in response to said expert system failing to complete a diagnosis based on said first file set, and said expert system uses said second file set to analyze at least one of said at least one fault and said at least one response.

11. An apparatus for diagnosing at least one fault associated with a computer system, said apparatus comprising:

an expert system analyzing said at least one fault;

an executive unit in electrical communication with said expert system;

a database in electrical communication with said expert system and said executive unit; and a script management unit, in electrical communication with said executive unit and said database, wherein said database comprises at least one diagnostic signal and at least one file set, said at least one file set comprising at least one diagnostic set comprising fault information for said at least one fault, and at least one runtime database file comprising at least one diagnostic script, wherein said executive unit invokes a first said at least one diagnostic signal directed to said computer system in response to said expert system analyzing said at least one fault, said executive unit receives at least one response from said computer system to said first said at least one diagnostic signal, and said executive unit invokes said at least one diagnostic script directed to said computer system, in response to said expert system analyzing at least one of said at least one fault and said at least one response, and wherein said script management unit executes said at least one diagnostic script directed to said computer system, in response to said expert system analyzing at least one of said at least one fault and said at least one response.

12. An apparatus for diagnosing at least one fault associated with a computer system, said apparatus comprising:

an expert system analyzing said at least one fault;

an executive unit in electrical communication with said expert system;

a database in electrical communication with said expert system and said executive unit;

a remote database server comprising at least one remote diagnostic signal; and a remote unit in electrical communication with said remote database server and said executive unit, wherein said database comprises at least one diagnostic signal, wherein said executive unit invokes a first said at least one diagnostic signal directed to said computer system in response to said expert system analyzing said at least one fault, and said executive unit receives at least one response from said computer system to said first said at least one diagnostic signal, and wherein said remote unit retrieves said at least one remote diagnostic signal from said remote database server and said executive unit invokes said at least one remote diagnostic signal directed to said computer system in response to said expert system analyzing at least one of said at least one fault and said at least one response.

13. An apparatus for diagnosing at least one fault associated with a computer system, said apparatus comprising:

an expert system analyzing said at least one fault;

an executive unit in electrical communication with said expert system;

a database in electrical communication with said expert system and said executive unit;

a remote database server comprising at least one remote segment comprising at least one remote diagnostic signal; and a remote unit in electrical communication with said remote database server and said executive unit, said remote unit retrieving said at least one remote segment from said remote database server in response to said expert system failing to complete a diagnosis, wherein said database comprises at least one diagnostic signal, wherein said executive unit invokes a first said at least one diagnostic signal directed to said computer system in response to said expert system analyzing said at least one fault, and said executive unit receives at least one response from said computer system to said first said at least one diagnostic signal, and wherein said executive unit invokes said at least one remote diagnostic signal directed to said computer system in response to said expert system using said at least one remote segment to analyze at least one of said at least one fault and said at least one response.

14. An apparatus as in claim 13 wherein said database comprises at least one local segment, and said at least one local segment and said at least one remote segment are file sets.

15. A method for diagnosing and remedying at least one fault associated with a computer system, comprising the steps of:

(a) analyzing said at least one fault by an expert system;

(b) selecting at least one first diagnostic signal by said expert system, in response to said analyzing step;

(c) invoking said at least one first diagnostic signal by said executive unit directed to said computer system, in response to said selecting step;

(d) receiving at least one response by said executive unit from said computer system;

(e) attempting to diagnose said at least one fault by said expert system in response to receiving said at least one response;

(f) completing a diagnosis of said at least one fault by said expert system;

(g) selecting at least one remedy by said expert system, in response to receiving said at least one response by said executive unit and completing said diagnosis; and (h) invoking said at least one remedy by said executive unit directed to said computer system, in response to said selecting at least one remedy step.

16. A method as in claim 15 further comprising the steps of:

receiving at least one response by said executive unit, in response to said at least one first diagnostic signal;

selecting at least one second diagnostic signal by said expert system, in response to said at least one response; and invoking said at least one second diagnostic signal by said executive unit directed to said computer system, in response to said selecting said at least one second diagnostic signal step.

17. A method for diagnosing at least one fault associated with a computer system, comprising the steps of:

(a) analyzing said at least one fault by an expert system;

(b) selecting at least one first diagnostic signal by said expert system, in response to said analyzing step;

(c) invoking said at least one first diagnostic signal by said executive unit directed to said computer system, in response to said selecting step;

(d) receiving at least one response by said executive unit from said computer system;

(e) attempting to diagnose said at least one fault by said expert system in response to receiving said at least one response, (f) receiving at least one response by said executive unit in response to said at least one first diagnostic signal;

(g) selecting at least one second diagnostic signal by said expert system, in response to said at least one response;

(h) retrieving said at least one second diagnostic signal from a remote database server; and (i) invoking said at least one second diagnostic signal by said executive unit directed to said computer system, in response to said selecting said at least one second diagnostic signal step and said retrieving said at least one second diagnostic signal step.

18. A method as in claim 15, the step of completing a diagnosis of said at least one fault comprising repeating as needed to complete said diagnosis the following substeps:

selecting at least one additional diagnostic signal by said expert system;

performing steps (c), (d) and (e) using said at least one additional diagnostic signal.

19. A method for diagnosing at least one fault associated with a computer system, comprising the steps of:

(a) analyzing said at least one fault by an expert system;

(b) selecting at least one first diagnostic signal by said expert system, in response to said analyzing step;

(c) invoking said at least one first diagnostic signal by said executive unit directed to said computer system, in response to said selecting step;

(d) receiving at least one response by said executive unit from said computer system;

(e) attempting to diagnose said at least one fault by said expert system in response to receiving said at least one response, (f) repeating as needed to complete a diagnosis the following substeps;

selecting at least one additional diagnostic signal by said expert system; retrieving said at least one additional diagnostic signal from a remote database server; and performing steps (c), (d) and (e) using said at least one additional diagnostic signal;

(g) generating at least one remedy by said expert system, in response to said repeating as needed to complete a diagnosis step; and (h) invoking said at least one remedy by said executive unit directed to said computer system, generated in response to said generating step.

* * * * *